(12) United States Patent
Aumoitte

(10) Patent No.: US 8,536,450 B2
(45) Date of Patent: Sep. 17, 2013

(54) SHEATH PROVIDING PROTECTION AGAINST RADIATION, IN PARTICULAR FROM THE ELECTRIC FIELD GENERATED BY ELECTRIC CABLES

(75) Inventor: Christian Aumoitte, Ecquevilly (FR)

(73) Assignee: Rayponse, Ecquevilly (FR)

( * ) Notice: Subject to any disclaimer, the term of this patent is extended or adjusted under 35 U.S.C. 154(b) by 395 days.

(21) Appl. No.: 12/679,672

(22) PCT Filed: Sep. 22, 2008

(86) PCT No.: PCT/FR2008/051692
§ 371 (c)(1),
(2), (4) Date: Mar. 24, 2010

(87) PCT Pub. No.: WO2009/050359
PCT Pub. Date: Apr. 23, 2009

(65) Prior Publication Data
US 2010/0193236 A1  Aug. 5, 2010

(30) Foreign Application Priority Data

Sep. 25, 2007 (FR) ..................... 07 57840

(51) Int. Cl.
*H01B 7/00* (2006.01)
(52) U.S. Cl.
USPC .......................................................... 174/36
(58) Field of Classification Search
USPC .......... 174/102 R, 108, 105 R, 110 R, 113 R, 174/120 R, 36
See application file for complete search history.

(56) References Cited

U.S. PATENT DOCUMENTS

| | | | | |
|---|---|---|---|---|
| 3,673,315 A | * | 6/1972 | Lasley | 174/107 |
| 4,461,923 A | | 7/1984 | Bogese, II | |
| 4,510,346 A | * | 4/1985 | Bursh et al. | 174/36 |
| 5,329,064 A | * | 7/1994 | Tash et al. | 174/36 |
| 5,939,668 A | * | 8/1999 | De Win | 174/36 |
| 6,259,019 B1 | * | 7/2001 | Damilo et al. | 174/36 |
| 6,664,466 B2 | * | 12/2003 | Bailey | 174/36 |
| 6,686,537 B1 | * | 2/2004 | Gareis et al. | 174/36 |
| 6,998,538 B1 | * | 2/2006 | Fetterolf et al. | 174/113 R |
| 2003/0168242 A1 | * | 9/2003 | Whidden | 174/113 R |
| 2005/0006126 A1 | * | 1/2005 | Aisenbrey | 174/68.1 |
| 2008/0283270 A1 | | 11/2008 | Aumoitte | |

FOREIGN PATENT DOCUMENTS

| | | |
|---|---|---|
| DE | 86 21 216 | 10/1986 |
| WO | 2006/016048 | 2/2006 |
| WO | WO2006/016048 A * | 2/2006 |

OTHER PUBLICATIONS

International Search Report dated May 11, 2009, from corresponding PCT application.

* cited by examiner

*Primary Examiner* — William H Mayo, III
(74) *Attorney, Agent, or Firm* — Young & Thompson

(57) ABSTRACT

A sheath is disclosed which provides protection against radiation. The sheath surrounds or is configured to surround at least a neutral cable, a earth cable and a phase cable which are all connected to the power grid. The sheath includes an outer layer made from electrically insulating plastic which covers an inner layer made from electrically conductive material, elements being provided to connect the layer of electrically conductive material to an electrical conductor intended to be earthed. The conductor to be earthed takes the form of a wire, all or part of which is made from electrically conductive material that extends internally along the entire length of the sheath and which is in electrical contact, at least along part of the length thereof, with the inner layer of electrically conductive material.

15 Claims, 2 Drawing Sheets

SHEATH PROVIDING PROTECTION AGAINST RADIATION, IN PARTICULAR FROM THE ELECTRIC FIELD GENERATED BY ELECTRIC CABLES

BACKGROUND OF THE INVENTION

1. Field of the Invention

The present invention relates to a protective sheath (conduit) against radiation, in particular from the electric field generated by electric cables extending inside the sheath, for example of the ICTA or ICTL type.

2. Description of the Related Art

So-called "shielded" cables are known which are used in order to transmit high-frequency telecommunications signals, either by means of a copper conductor, or by means of an optical fibre, etc. The shielding is generally produced using a braid made of a conductive metal wire which is separated from the conductive wire or from the optical fibre by a layer of insulating plastic material, and is surrounded on the outside by another layer of insulating plastic material.

Currently, protective sheaths called ICTA, ICTL sheaths (conduits), etc. are commonly used in the building industry, the outer surface of which is smooth or corrugated in order to give them a certain flexibility whilst reinforcing their resistance to crushing. These sheaths have no shielding against radiation, and in particular, against electric fields.

These protective sheaths receive several electric cables, generally a neutral cable, an earth cable and a phase cable connected to the electrical distribution network, the frequency of which is usually 50 Hz. They can also receive telecommunications cables used for transmitting telecommunications signals.

The cables are intended to supply power to various devices or power outlets.

These cables generate an electric field which can interfere with certain devices, or certain telecommunications signals, or even cause health problems.

In WO 2006/016048, the Applicant created and described a protective sheath against radiation, in particular from the electric field, generated by electric cables of the above type.

The sheath described in the above document comprises an outer layer made of electrically insulating material which covers an inner layer made of electrically conductive material. The end of the sheath comprises removable connection means for connecting the layer of electrically conductive material to an electrical conductor intended to be connected to earth, said sheath surrounding or being intended to surround at least a neutral cable, an earth cable and a phase cable connected to the electrical distribution network.

The electrically conductive layer connected to earth very greatly attenuates the radiation towards the outside of the electric field generated by the cables extending inside the sheath.

BRIEF SUMMARY OF THE INVENTION

The purpose of the present invention is to provide improvements to the above-described protective sheath.

This purpose is achieved according to the invention by a protective sheath against radiation, in particular from the electric field generated by electric cables extending inside the sheath, said sheath surrounding or being intended to surround at least a neutral cable, an earth cable and a phase cable connected to the electrical distribution network, and comprising an outer layer made of electrically insulating plastic material which covers an inner layer made of electrically conductive material, means being provided for connecting the layer of electrically conductive material to an electrical conductor intended to be connected to earth, characterized in that the conductor intended to be connected to earth is a wire, wholly or partially of electrically conductive material extending inside the sheath over its whole length, which is in electrical contact, over at least a part of its length, with the inner layer of electrically conductive material.

The layer of electrically conductive material can be a conductive metal foil extending annularly or helically under the outer insulating layer. This conductive metal foil can be a foil of aluminium, Mumetal, etc.

However, the layer of electrically conductive material is preferably a polymer loaded with conductive particles.

By conductive particles is meant particles in powder form, for example graphite, fibres, flakes, etc.

This layer can also be made of a polymer which is conductive in itself, without the need to include conductive particles within its matrix, as is known to manufacturers or developers of polymers, providing that this polymer is sufficiently conductive to conduct the electric fields.

For that reason, the different layers can be co-extruded.

Also preferably, the sheath is corrugated outside and inside, allowing it to be bent and easily cut to length.

Surprisingly, it was found that the simple fact of placing an electrically conductive wire inside the sheath was sufficient to establish an electrical connection between this wire and the inner layer of electrically conductive material. In fact, due to gravity and the length of the sheath, this wire comes into contact with the layer above, in a random manner, at least at several points, which is sufficient to make the electrical connection.

This means is much simpler and more economical than the connection clips described in the Applicant's document WO 2006/016048, which thus become unnecessary in most cases.

In a first embodiment example of the invention, the above-mentioned wire, connected to earth during implementation, is a metal wire without an insulating sheath, in order to be capable of establishing an electrical contact with the inner layer of electrically conductive material. This wire could be made of an electrically conductive plastic material.

In order to guarantee improved contact, in particular in the case of sheath sections having a short length, it is advantageous for the above-mentioned wire to include, close to at least one of the ends of the sheath, a fold shaped during its implementation, in order to obtain a contact between the wire and the electrically conductive inner layer at at least two opposite points of the inner surface of the sheath.

In another embodiment example of the invention, the wire, connected to earth during implementation, is a metal wire covered externally, wholly or partially, by a layer which is sufficiently conductive to conduct the electric field but not the electric current, made of a polymer loaded with conductive particles. By coming into contact with the electrically conductive inner layer of the sheath, this layer thus makes it possible to establish an electrical connection with the wire connected to earth. This example also relates to the previously-described fold.

The above wire can be the earth cable extending inside the sheath, but the outer insulating cover of which is replaced, wholly or partially, by a layer made of polymer loaded with conductive particles. In this case, the connection to earth of the earth wire simultaneously connects the conductive inner layer to earth without the need to make any other connection.

This layer can also be covered by a layer of a polymer of a type which is conductive in itself, without the need to include conductive particles within its matrix, as is known to manufacturers or developers of polymers, providing that this polymer is sufficiently conductive to conduct the electric fields.

The sheath can be corrugated outside and inside in order to facilitate its cutting and bending. The sheath can also be slit over its whole length in order to facilitate the insertion of the cables in certain cases.

In another version of the invention, the sheath according to the invention also comprises detachable connection means for connecting the layer of electrically conductive material to an electrical conductor intended to be connected to earth, these means comprising a conductive clip capable of being clipped to an outer and/or inner ring of the sheath in order to be in contact with the layer of electrically conductive material.

This conductive clip can be used in certain cases, for example in the case of a very short sheath, in order to guarantee a good electrical connection between the inner layer of electrically conductive material and the earth wire.

According to another feature of the invention, the sheath according to the invention comprises a sleeve for connecting the ends of two sheath sections, this sleeve being suitable for engaging on the ends of these two sections and comprising, on its inner surface, retaining catches capable of engaging between two outer rings of each of the two sections, means being moreover provided to establish the electrical connection between the conductive layers of the two sections.

Preferably, said means comprise a flexible conductor connecting the conductive layers of the two sections to each other.

BRIEF DESCRIPTION OF THE DRAWINGS

Other features and advantages of the invention will also become apparent in the following description.

In the attached drawings, given by way of non-limitative examples.

DETAILED DESCRIPTION OF THE PREFERRED EMBODIMENTS

Figure 1:
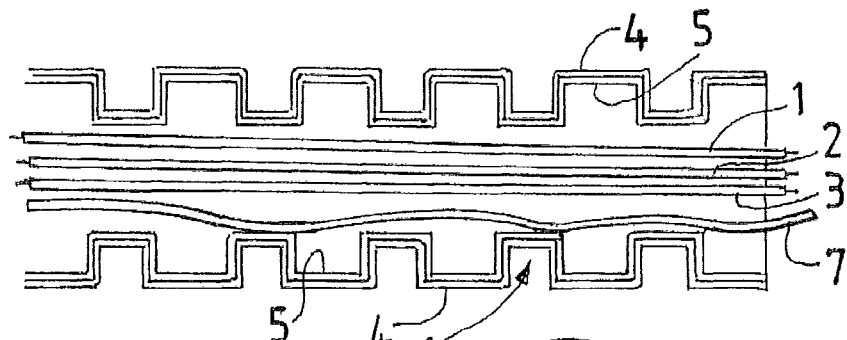
FIG. 1 is a longitudinal section view of a first version of an anti-radiation sheath according to the invention.
Figure 2:
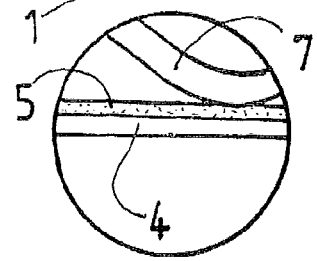
FIG. 2 is an enlarged-scale view of the detail A in FIG. 1.

FIG. 1 diagrammatically shows a protective sheath against radiation, in particular from the electric field generated by electric cables 1, 2, 3 extending inside the sheath, said sheath surrounding or being intended to surround at least a neutral cable 1, an earth cable 2 and a phase cable 3 connected to the electrical distribution network. The sheath comprises an outer layer 4 made of electrically insulating plastic material which covers an inner layer 5 made of electrically conductive material.

The electrically conductive layer 5 can be a conductive metal foil, such as an aluminium foil extending annularly or helically beneath the outer insulating layer 4.

However, preferably, the layer of electrically conductive material is a polymer loaded with conductive particles.

By conductive particles is meant particles in the form of powder, for example graphite, fibres, flakes, etc.

For that reason, the different layers can be co-extruded.

Also preferably, the sheath is corrugated outside and inside, allowing it to be bent and easily cut to length.

The outer insulating layer 4 can be made of a plastic material of the same quality as the standard sheaths currently used in the building industry, such as polypropylene, polyethylene or PVC.

The outer diameter of the sheath can vary according to the currently existing ranges for standard unprotected sheaths.

The electrically conductive layer 5, when it is constituted by an aluminium foil, can be very thin: approximately 0.01 mm.

The above sheath can be produced in several steps or in a single step by over-moulding or similar.

The sheath could be slit lengthwise in order to allow or to facilitate installation of the cables according to the intended application.

According to the invention, the conductor, which is intended to be connected to earth, is a wire 7, all or part of which is made of a conductive material extending inside the sheath, over the whole length thereof. This wire 7 is in electrical contact over at least a part of its length with the inner layer 5 of electrically conductive material.

In the example of FIG. 1, the wire 7 is a metal wire, for example made of copper or aluminium, without an insulating sheath. This wire could be made of an electrically conductive plastic material.

Figure 3:
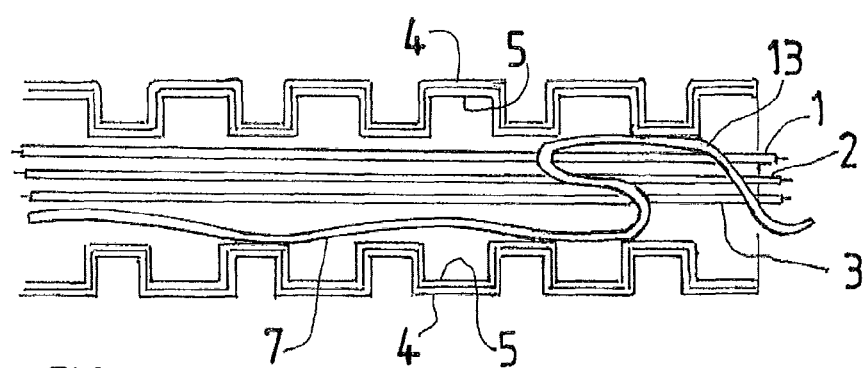
FIG. 3 is a cross-section view similar to FIG. 1 relating to a first improvement of the sheath according to the invention.

In the case of FIG. 3, close to at least one of the ends of the sheath, the wire 7 comprises a fold 13 shaped during its implementation in order to obtain a contact between the wire 7 and the inner layer 5 of electrically conductive material at at least two opposite points of the inner surface of the sheath. This fold 13 makes it possible, if necessary, to guarantee an optimal electrical contact between the wire 7 and the layer 5.

Figure 4:
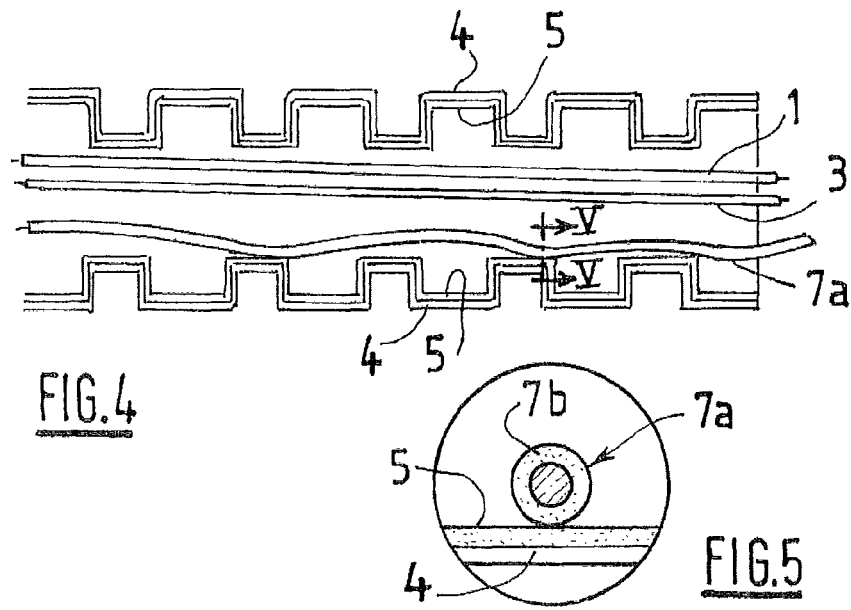
FIG. 4 is a view similar to FIGS. 1 and 3, relating to a further version of a sheath according to the invention.
Figure 5:
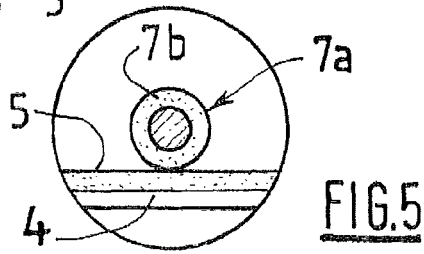
FIG. 5 is an enlarged-scale cross-section view along the plane V-V in FIG. 4.

In the example of FIG. 4, the wire 7*a* is a metal wire wholly or partially covered externally by a layer of polymer loaded with conductive particles which, on contact with the layer 5 of the sheath, makes it possible to establish the connection to earth. In this example, the wire 7*a* is the earth cable extending inside the sheath, but the insulating outer cover (see FIG. 5) of which is replaced, wholly or partially, by a layer 7*b* which is sufficiently conductive to conduct the electric field but not the electric current, made of polymer loaded with conductive particles. This wire 7*a* replaces the cable 2 in FIG. 1.

Figure 6:
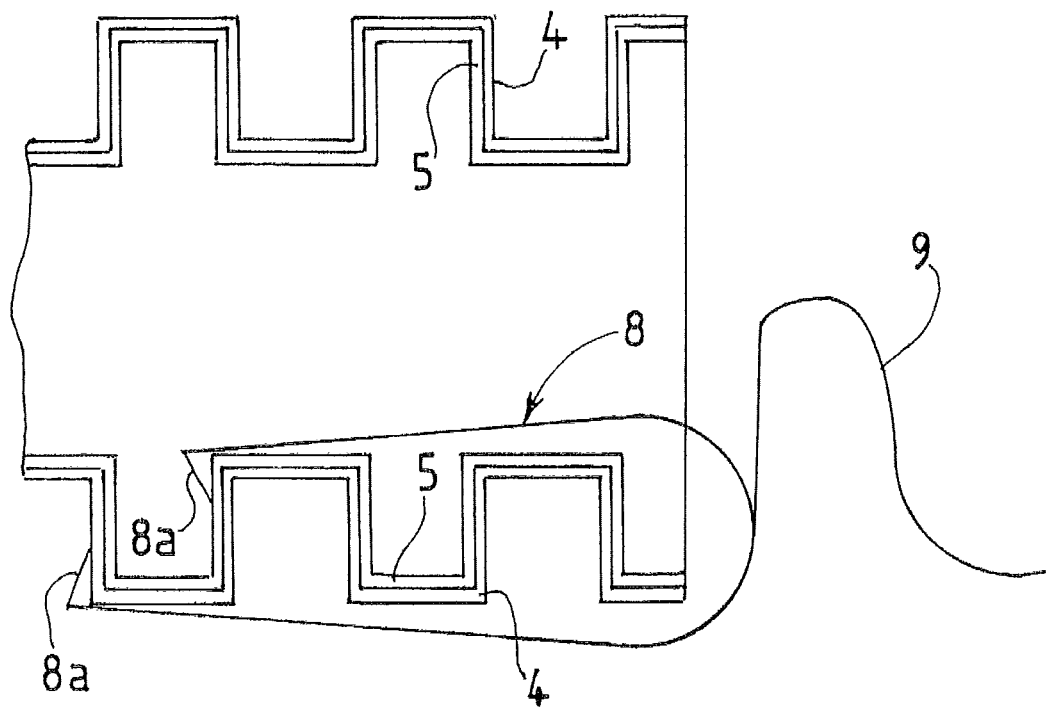
FIG. 6 is a longitudinal section view showing a sheath according to the invention, one end of which is equipped with a part for connection to an earth wire.

In the example of FIG. 6, a conductive clip 8 has been provided, connected to a conductor 9 intended to be connected to earth. This clip 8 is suitable for elastically pinching one end of the wall of the sheath.

To this end, the ends 8*a* of the clip 8 are shaped in order to attach to an outer and/or inner ring of the sheath, in order to be in contact with the layer 5 of electrically conductive material.

Such a clip 8 can be used either to replace the wire 7 or 7*a* in FIGS. 1 to 4, or to complete or better guarantee the connection to earth, in particular in the case of short sheaths in which the wire 7 or 7*a* would not allow an optimal contact to be made with the layer 5.

Figure 7:
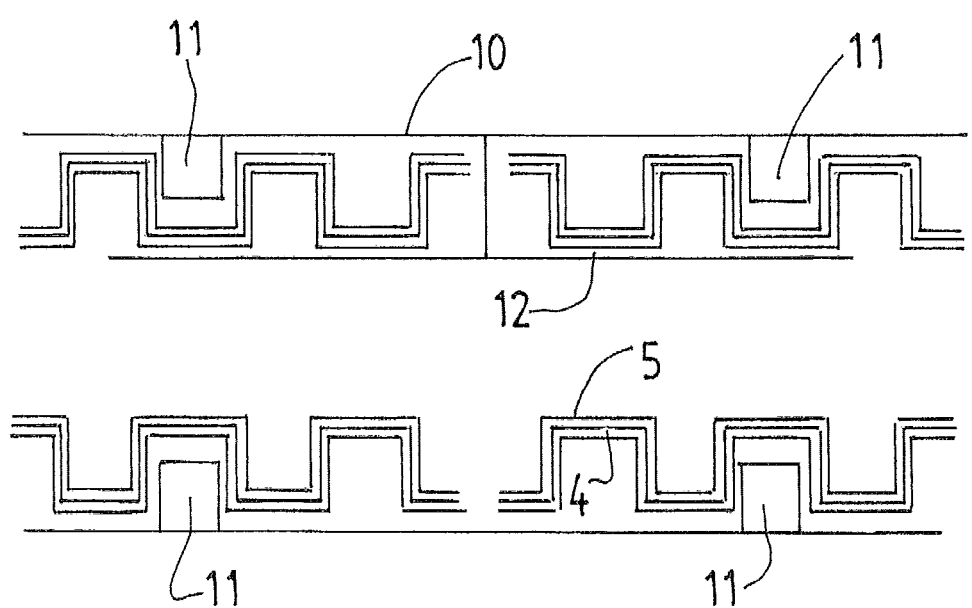
FIG. 7 is a longitudinal section view of two sheath sections according to the invention assembled by means of a sleeve.

In the case of FIG. 7, a sleeve 10 is provided in order to connect the ends of two sections of sheath. This sleeve 10 is suitable for engaging onto the ends of the two sheath sections and comprises, on its inner surface, retaining catches 11 capable of engaging between two outer rings of each of the two sections.

Moreover, a flexible conductor 12 connects the layers 5 of electrically conductive material of the two sections, making it possible to establish the continuity of the layer 5.

The sheath that has just been described has the following main advantages:

Due to its corrugated structure, the sheath is flexible, bendable and easily cut to length, In addition, the sheath is impermeable to liquids, in particular water and concrete laitance. It can thus be embedded in concrete.

The implementation, in particular the earth connection of the conductive layer, is carried out by a much simpler, quicker and more economical method than by using connection clips such as those described in the Applicant's patent WO 2006/016048, which thus become unnecessary in most cases.

The sheath, in its version with a layer 5 of electrically conductive material made of polymer loaded with conductive particles, can be produced economically from polypropylene for example, and by simultaneous co-extrusion of several layers.

The sleeve 10 shown in FIG. 7 makes it possible to easily connect two sheath sections whilst ensuring the continuity of the conductive layer.

In a variant capable of being combined with the previously-described embodiments, all or part of the wires inside the sheath are twisted together, in order to thus reduce the magnetic field emitted. In fact, as well as the electric fields the reduction of which is sought, the electrical wires also emit magnetic fields when they carry a current supplying electrical power to a device. It is beneficial to reduce these magnetic fields, and a demand exists for this, for the same type of reasons as for the electric fields.

The pitch of the twist can be a few tens of centimeters, for example from 20 cm to 100 cm and preferably between 40 cm and 60 cm. It is not necessary to include the earth wire in this twist. For example in the case of wires for single-phase alternating current (220V or 110V), the phase wire and the neutral wire are preferably twisted together without including the earth wire, if any. For example in the case of a three phase system, the three phase wires are preferably twisted together without the earth wire, possibly with the neutral wire, if any.

The sheath can thus be supplied and installed pre-cabled with twisted wires, or the twisted wires can be supplied separately and inserted into the sheath before or after installation.

The invention claimed is:

1. A protective sheath against radiation, said sheath surrounding or being configured to surround at least a neutral cable, an earth cable and a phase cable connected to an electrical distribution network and provided separately from the sheath, said protective sheath comprising:
a corrugated, flexible, stand-alone longitudinal enclosure separate from the cables and defining an inner wall, an outer wall, a terminal end, and an internal space defined within the enclosure internal of the inside wall, the enclosure being configured to receive the cables provided separately from the protective sheath within the internal space of the enclosure, the enclosure comprising
a conductive inner layer of electrically conductive material,
an outer layer made of electrically insulating plastic material covering the conductive inner layer, and
means for connecting the conductive inner layer to an electrical conductor configured to be directly connected to earth, the conductor being a wire made wholly or partially of a conductive material, extending inside the internal space of the enclosure over the whole length thereof,
wherein the wire is in electrical and physical contact in multiple points inside in the internal space and along the length of the enclosure of the protective sheath, over at least a part of the length of the wire, with the conductive inner layer, in order to obtain a sufficient electrical connection.

2. The sheath according to claim 1, wherein the conductive layer is a conductive metal foil.

3. The sheath according to claim 2, wherein said foil is an aluminum foil.

4. The sheath according to claim 1, wherein the conductive layer is made of a polymer loaded with a conductive powder.

5. The sheath according to claim 4, wherein the conductive powder is graphite.

6. The sheath according to claim 1, wherein the wire configured to be connected to earth is one of a metal wire without an insulating sheath and a wire made of an electrically conductive plastic material.

7. The sheath according to claim 6, wherein, in the vicinity of at least one end of the sheath, the wire configured to be connected to earth comprises a fold configured to obtain a contact between the wire configured to be connected to earth and the conductive layer at at least two opposite points of the inner surface of the sheath.

8. The sheath according to claim 1, wherein all or part of the wire configured to be connected to earth is covered externally by a layer which is sufficiently conductive to conduct an electric field but not electric current, the wire being made of a conductive or semi-conductive polymer.

9. The sheath according to claim 8, wherein, in the vicinity of at least one end of the sheath, the wire configured to be connected to earth comprises a fold configured to obtain a contact between the wire configured to be connected to earth and the conductive layer of polymer loaded with conductive particles at at least two opposite points of the inner surface of the sheath.

10. The sheath according to claim 9, wherein the wire configured to be connected to earth is the earth cable extending inside the sheath, and having an outer insulating covering comprising, wholly or partially, a layer which is sufficiently conductive to conduct the electric field but not the electric current, and made of a conductive or semi-conductive polymer.

11. The sheath according to claim 8, wherein the wire configured to be connected to earth is the earth cable extending inside the sheath, and having an outer insulating covering comprising, wholly or partially, a layer which is sufficiently conductive to conduct the electric field but not the electric current, and made of a conductive or semi-conductive polymer.

12. The sheath according to claim 1, wherein the sheath is corrugated outside and inside.

13. The sheath according to claim 1, further comprising means of detachable connection for connecting the conductive layer to an electrical conductor configured to be connected to earth, the detachable connecting means comprising a conductive clip configured to attach to an outer ring and/or an inner ring of the sheath in order to be in contact with the conductive layer.

14. The sheath according to claim 1, further comprising:
a sleeve configured to connect ends of two sheath sections, the sleeve being configured to engage onto the ends of the two sections and comprising, on an inner surface thereof, retaining catches configured to engage between two outer rings of each of the two sections; and means for establishing the electrical connection between the conductive layers of the two sheath sections.

15. The sheath according to claim 14, wherein the means for establishing the electrical connection between the conductive layers comprises a flexible conductor connecting the conductive layers of the two sections to each other.

* * * * *

UNITED STATES PATENT AND TRADEMARK OFFICE
CERTIFICATE OF CORRECTION

PATENT NO. : 8,536,450 B2  Page 1 of 1
APPLICATION NO. : 12/679672
DATED : September 17, 2013
INVENTOR(S) : Christian Aumoitte It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 481 days.

Signed and Sealed this

Fifteenth Day of September, 2015

Michelle K. Lee
*Director of the United States Patent and Trademark Office*